Jan. 11, 1949.  R. L. DAVIS  2,459,064
ELECTROMECHANICAL DRIVE SYSTEM
Filed Jan. 5, 1946  2 Sheets-Sheet 1
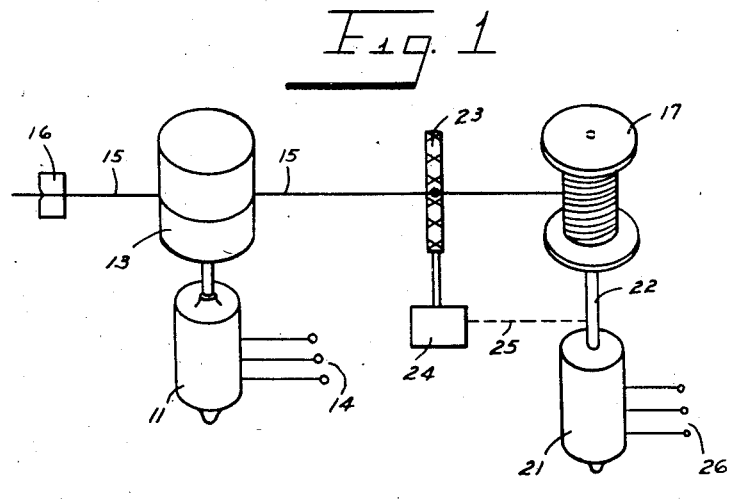
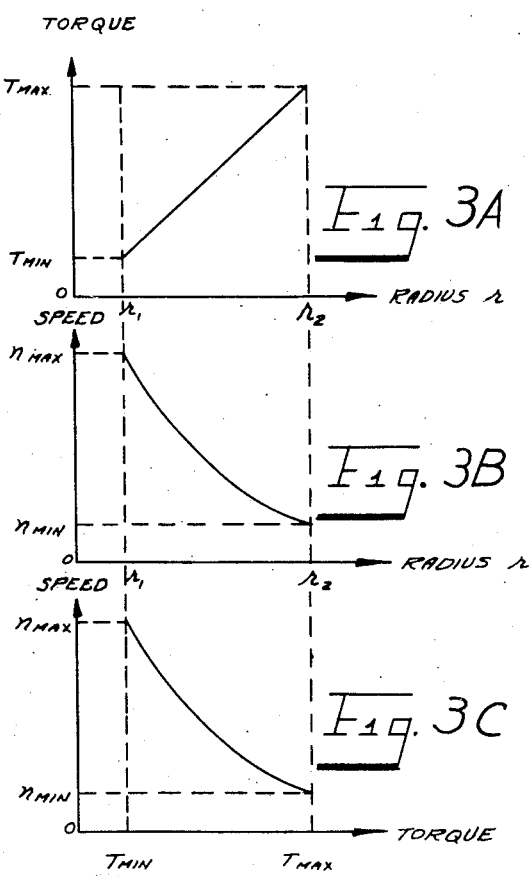
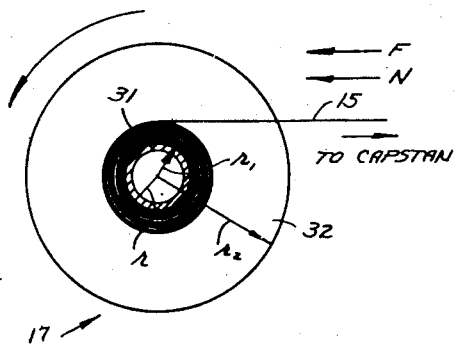
INVENTOR.
RALPH L. DAVIS
BY
ATTORNEYS

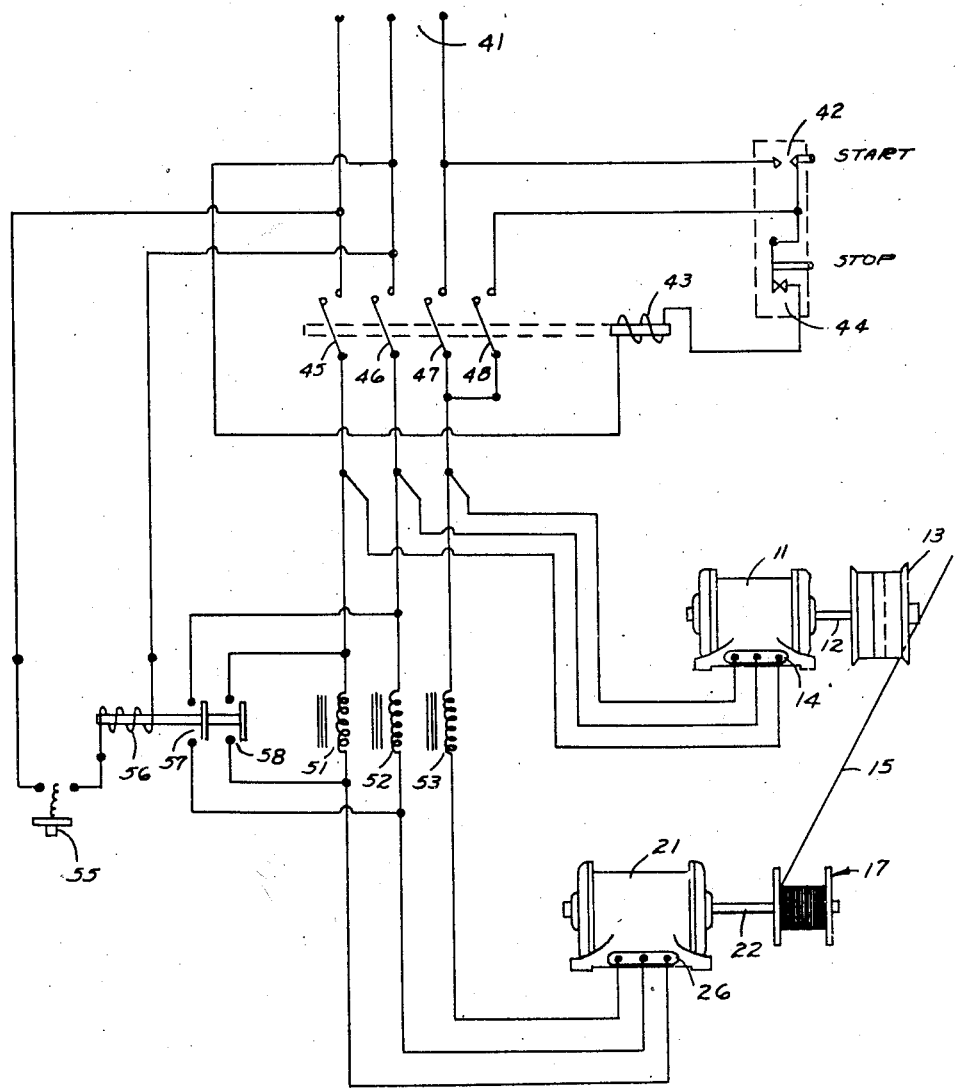

Patented Jan. 11, 1949

2,459,064

UNITED STATES PATENT OFFICE 2,459,064

ELECTROMECHANICAL DRIVE SYSTEM

Ralph L. Davis, Wallingford, Conn.

Application January 5, 1946, Serial No. 639,447

7 Claims. (Cl. 318—6)

The present invention relates in general to an electromechanical drive system and more particularly to simplified apparatus for reeling a filament such as a wire or thread at substantially constant tension.

In numerous manufacturing processes, it is required that a filament of a particular type be uniformly wound upon a take-up reel or spool and that the tension on the filament during this operation remain within narrow, predetermined limits. A representative example of a manufacturing process presenting such a problem is found in the production of wire.

Wire insulating machinery generally includes an extrusion device consisting of a die having a diameter related to the desired insulation thickness. The conductor to be insulated is drawn through this die as the insulating compound is applied under suitable pressure. As the coated wire comes from the extrusion machine, it passes around a comparatively large diameter capstan, which in turn is driven at a substantially constant speed by a motor. The capstan thus draws the wire through the extrusion machine, friction between the wire and the capstan functioning to transmit the driving force from the capstan motor to the wire.

Factors such as capstan diameter, wire diameter and the nature of the insulating compound, determine the speed required of the capstan motor. For a particular set of conditions, the capstan motor speed is constant and thus the linear speed at which the insulated wire is fed through the extruder and over the capstan is also constant. Adjustment of capstan motor speed may be used to control the insulation diameter, or to flatten the coating applied to the wire.

The wire, as it proceeds over the capstan at a constant linear speed, is transferred therefrom to a take-on reel through a traverse mechanism. The reeling of the wire is accomplished by a separate drive motor. As is well understood, the effective reel diameter changes continuously as the wire reeling operation progresses. Initially the winding diameter is equal to the diameter of the central drum of the reel. Dependent upon the type of reel used, the diameter increases as the wire is applied, to substantially that of the reel side flanges, which may be a number of times greater than the initial diameter. The linear speed of the wire, however, remains unchanged, as it is solely a function of capstan speed, and accordingly the angular speed of the reel must be uniformly varied from a maximum when the reeling is started to a minimum speed as the reeling is completed, the minimum speed being a small fraction of the maximum speed value.

Another consideration, in addition to that of the speed variation of the take-up reel, is that of the tension applied to the wire by the reel drive motor. The reel drive motor does not directly supply power to the wire drawing capstan and does not in normal operation influence the extrusion speed. But in order that the capstan drive system operate properly, it is essential that the wire loops about the capstan remain secure, so that the required frictional contact between wire and capstan is maintained. The reel drive system then, in taking the wire from the capstan, must operate at a speed which continuously maintains the wire taut between the reel and the capstan. Clearly, if the reel drive motor slows down, so that at the linear speed of wire travel utilized the wire sags between reel and capstan, the frictional drive relation will be lost and the wire will slip on the capstan. As a result the wire extrusion rate will change or fall to zero, either effect serving to destroy the quality of the final product.

If on the other hand, the reel drive is operative to increase the tension of the wire beyond that value actually required, or to change the applied tension suddenly, the wire is likely to snap between the reel and the capstan.

From the foregoing discussion, therefore, it may be seen that the ideally suited take-up reel drive apparatus must function to maintain the wire at a predetermined constant tension between reel and capstan, while providing a uniformly decreasing angular speed to the reel itself, the linear speed of the wire being invariable throughout.

In some prior attempts to solve the wire reeling problem stated above have been classifiable as mechanical slip mechanisms, or as direct drive mechanisms utilizing special tension control apparatus. In the former type, the reel was driven by a motor through a slip clutch. The normal operating speed of the motor was higher than the maximum speed required during reeling. The stiffness of the clutch determined the wire tension. If the clutch would bind, the wire would snap. Furthermore, since the clutch would slip at a prearranged torque, the tension of the wire would vary inversely with the effective reeling diameter, thus rendering the arrangement wholly unsatisfactory for wire where the reeling tension was important.

The second mentioned prior art reeling mechanism employed special tension control apparatus. As an example thereof, one system employed a loop of the wire being reeled, between the take-up reel and the capstan, to operate a tension measuring device thereby indicating the instantaneous reel diameter. A tension change so indicated was coupled through a linkage to operate in turn a complex mechanical speed control system linking the take-up reel to its drive motor. The speed control unit used generally was a conventional "Reeves drive." Although this apparatus was able to provide the speed and tension control desired, the cost of the equipment for reeling the wire was a disproportionate figure relative to the cost of the remainder of the wire processing machinery.

My present invention contemplates and has as a primary object the provision of a simplified, inexpensive electromechanical drive system particularly adaptable to the reeling of a filament at a substantially constant and predetermined tension.

Another object of my invention is to provide a positive motor drive for a take-up reel, which with a minimum of auxiliary electrical equipment permits continuous reeling of a filament at a fixed tension.

Briefly, I have discovered that a wire may be successfully reeled through the utilization of a take-up reel connected in positive fashion to a conventional type drive motor, which motor is energized from a power source through a predetermined impedance element. For reasons which will hereinafter be disclosed in greater detail, the apparatus of the present invention utilizes in an embodiment thereof a polyphase induction motor having a normal power rating somewhat in excess of the maximum power requirement of the reeling apparatus. This motor is energized from a polyphase power source through a plurality of inductors or other impedance elements, and accomplishes the desired result of reeling a wire at constant tension over extremely wide changes in effective reeling diameter.

It is therefore a further object of my present invention to provide a simplified take-up reel drive comprising a combination of a driving motor and an impedance circuit for providing desired speed and torque characteristics.

A still further object of the present invention is to provide inexpensive equipment for reeling a wire at uniform tension comprising an oversize reel driving motor energized through a plurality of impedance elements.

These and other objects of the present invention will now become apparent from the following detailed specification taken in connection with the accompanying drawings in which Figure 1 is a diagrammatic representation of the essential elements of a system utilizing the present invention.

Figure 2 is a cross-sectional view of a reel illustrating certain principles.

Figures 3A, 3B and 3C are graphical representations of the required drive system characteristics.

Figure 4 is a schematic wiring diagram of the electrical apparatus illustrated in Figure 1 and incorporating the principles of the present invention.

Referring now to Figure 1, there are illustrated the elements of a wire coating process of the type hereinabove described. It will be understood that the present disclosure, although discussed in connection with a wire manufacturing process, need not be limited thereto. In Figure 1, a capstan driving motor 11 is mechanically coupled by drive shaft 12 to rotatable capstan 13.

The motor 11 is preferably energized from a polyphase power source at terminals 14 through control apparatus not illustrated in Figure 1. The speed of the capstan 13 is adjustable, any suitable speed control means being usable. For any particular process, however, the angular speed of the capstan 13 is constant thereby establishing a constant peripheral speed at the surface thereof.

The capstan 13 serves to draw a wire or other filament 15 from an extrusion machine represented by die 16. Actually the extrusion machine may comprise apparatus for applying insulating compound under pressure to a conductor as it is drawn through the die 16. Other processes, such as wire drawing, vulcanization, and the like, may equally well be accomplished in the manner illustrated.

The wire 15 is looped around the capstan 13, a single turn being shown in Figure 1. The force required to draw the wire 15 through the extrusion die 16 is transmitted to the wire by frictional contact with the capstan 13. The wire 15 passes from the capstan 13 to a take-up reel 17 which is driven by motor 21 through positive drive by shaft 22. The reel 17 is removably attached to the shaft 22, so that when full, the reel 17 may be replaced by another empty reel. The wire 15 is uniformly applied to the reel 17 in layers as determined by a conventional traverse mechanism comprising grooved shaft 23 which is driven at a predetermined sub-multiple of the speed of reel drive motor 21 through a gear box 24. The mechanical coupling between the gear box 24 and the reel motor 21 is represented by the broken line 25. The reel motor 21 is energized preferably from a polyphase power source at terminals 26. The electrical considerations will be discussed hereinbelow.

A quantitative analysis of the basic requirements of the system shown in Figure 1 will now be given and reference is made to Figures 2 and 3. In Figure 2 there is shown a cross-section of the reel 17 as it appears when partially filled with wire. The wire 15 is started around the reel at the inner drum 31 having a radius $r_1$. The wire is applied to the reel until substantially full providing a maximum radius $r_2$ equal to the radius of the circular side flange 32. The instantaneous radius at which the wire 15 is being applied to the reel is designated by $r$.

As previously disclosed, the wire 15 is applied to the reel 17 at a constant velocity, illustrated by vector $v$, which velocity is a function of the constant capstan speed. The tension in the wire 15 is designated by the force vector $F$, and is the tension in the section of wire 15 between the reel 17 and the capstan 13. For reasons previously disclosed, it is highly desirable that the tension $F$ remain constant throughout the entire reeling operation.

In order that the wire tension $F$ remain constant, it will now be clear that the reel driving motor 21 of Figure 1 must supply a driving torque $T$ which is instantaneously equal to the product of tension $F$ and the radius of reeling $r$, that is, $$T = rF$$

With $F$ constant, the minimum driving torque is required when the wire is initially started about the reel 17 which torque $$T_{min} = r_1 F$$

The maximum torque requirement of motor 21 occurs when the reel is full, which torque $$T_{max} = r_2 F$$

Since the radius $r$ is the only variable, the torque requirement is a linear function of the radius, as illustrated graphically in Figure 3A. Here motor torque $T$ is plotted as a function of reeling radius $r$. The torque rises linearly from $T_{min}$ to $T_{max}$ as the wire is applied to the reel 17.

The amount of wire 15 applied to the reel 17 during each revolution thereof is given simply by $2\pi r$, $r$ being the instantaneous wire radius as shown in Figure 2. Since $v$ is the linear speed of the wire, the instantaneous speed of the reel $n$ is $$n = \frac{v}{2\pi r}$$

The same units of length are, of course, used for $v$ and $r$. The reel speed will be at a maximum when the wire is started thereon; thus $$n_{max} = \frac{v}{2\pi r_1}$$

and the reel speed a minimum when the reel is substantially full; thus $$n_{min} = \frac{v}{2\pi r_2}$$

The required speed $n$ is thus an inverse function of the reeling radius $r$ and varies between the limits of $n_{max}$ and $n_{min}$ as the reel is filled with wire. This relation is graphically shown in Figure 3B. Reel speed is plotted as a function of radius $r$, the curve being of the form of a rectangular hyperbola between $n_{max}$ and $n_{min}$.

The torque and speed curves of Figures 3A and 3B plotted as a function of reel winding radius $r$ may be combined to provide a characteristic curve showing the relation required between reel drive motor speed $n$ and shaft torque $T$, which characteristic will in turn provide the ideal conditions of constant wire tension $F$ at constant linear wire speed $v$ as the wire winding radius on the reel changes from minimum to maximum. This characteristic is shown in Figure 3C, speed $n$ being plotted as a function of torque $T$. Since the torque $T$ is linearly related to the radius $r$, the shape of the curve in Figure 3C is essentially that shown in Figure 3B.

It is emphasized at this point that the curve of Figure 3C covers extremely wide ranges of speed and torque. Thus it is apparent that the range to be covered is determined by the ratio of maximum and minimum radii:

$$\frac{r_2}{r_1}$$

This ratio will vary with the type of reel used, and where for example a reel has a large flange radius and small central drum radius, the ratio will be very large.

An embodiment of a reel drive system having the speed torque characteristics illustrated in Figure 3C and incorporating the principles of the present invention, is shown in Figure 4. In Figure 4, elements corresponding to those shown in the mechanical detail, Figure 1, are similarly numbered. The system is energized from a three phase alternating current supply at terminals 41. When the start button 42 is momentarily closed, the relay coil 43 is energized from one of the three phases through the stop button 44. Energization of the relay 43 pulls the ganged movable contacts 45, 46, 47, 48 into contact with their associated stationary contacts. Contact 48 in closing effectively short circuits the start button 42, sealing in the relay 43 when the start button is released. The relay 43 may then be de-energized by pushing the stop button 44 momentarily.

Contacts 45, 46 and 47, when closed, energize the three phase capstan and reel driving motors 11 and 21 at terminals 14 and 26 respectively. As illustrated, the capstan motor is thrown directly across the line, as is permissible for alternating current motors of moderate horsepower rating. The reel driving motor, however, is energized through a plurality of impedance elements, herein illustrated as iron core inductors 51, 52 and 53, one in each line, between the starting contacts 45, 46 and 47 and the motor terminal 26. The proper selection of the motor 21 and the inductors 51, 52 and 53 provide the reel drive motor 21 with an output characteristic as illustrated in Figure 3C.

The motor 21 is preferably a three phase induction motor. Ordinarily a three phase motor, when started and operated at rated line voltage, provides a very stable output characteristic, the decrease in speed, or slip, of a motor of this type being a small fraction of the normal operating speed as the load torque is changed from a small value to full load output torque. Such a motor is inherently a constant speed device. The currents induced in the rotor are small since the rotor slips only slightly with respect to the main rotating field thereof. In the present invention the inductors 51, 52 and 53 in the line from the power source 41 distort the normal stable induction motor characteristic so that the slip, ordinarily small, fluctuates over wide ranges, the motor never reaching synchronous speed, as the applied torque is altered, and the reel is filled with wire.

The flow of induction motor current through inductors 51, 52 and 53 drops the voltage appearing at motor terminals 26 from the source voltage at terminals 41, by an amount directly proportional to the line current. As the motor 21 has a normal voltage rating equal to that of the line at terminals 41, it may be seen that the motor operates at a variable voltage, below its rating. At reduced voltage, the slip of a motor is highly dependent upon load. Thus, as the reel 17 is filled with wire and the torque increased, the motor current rises, increasing the reactance drop across the inductors and reducing the motor applied voltage. In turn, this reduction of voltage increases motor slip and the speed falls, in accordance with the ideal speed relationships of Figures 3B and 3C.

As mentioned above, the introduction of inductors 51, 52 and 53 changes the normal characteristic of small slip to an unstable characteristic of wide speed variation below synchronous speed. The heating of a polyphase induction motor is highly dependent upon the speed of the rotor relative to synchronous speed, since this speed relation determines the rotor current induced. In the present invention, when large slips or low speeds are present as when the reel 17 is substantially full, and the load torque a maximum, the rotor current becomes particularly large with the generation of large amounts of heat for the power developed. Accordingly it is preferred that the motor 21 for protective purposes have a normal nameplate power rating in excess of the maximum power requirement of reeling the wire 15. The ratio of nameplate power rating to maximum power required at the motor shaft 22 may be of the order of three to one, or five to one. A motor of the normal required power rating may, however, be employed, particularly if the ratio of maximum and minimum reel radii, $r_2/r_1$, is small, thus requiring only a comparatively small speed variation.

As an example of the application of such a reel drive system, a ¾ H. P. motor is used to drive a reel having a one foot hub diameter and a three foot diameter on full winding. The linear speed of the wire being reeled is constant at 250 feet per minute. The inductors 51, 52 and 53 are each made up of a number of conventional fluorescent lamp ballast inductors in parallel. The power supply is a three phase 220 volt source, and the drop across the inductors reduces the motor terminal voltage to about 110 volts.

It has been observed that the reel drive motor 21 is sluggish in starting inasmuch as closure of the main line contacts 45—48 results in a starting current surge through inductors 51, 52 and 53 which reduces terminal 26 voltage below the minimum starting value. To overcome these effects, an auxiliary start button 55 has been provided, which when closed energizes relay 56 and in turn closes contacts 57 and 58. As illustrated, the closure of contacts 57 and 58 will short circuit two of the series inductors 51 and 52 to apply full voltage to some of the motor phases. The motor thus rapidly attains the required speed, whereupon the button 55 may be released, to permit inductors 51 and 52 to resume control of the speed-torque characteristics of the motor 21.

The impedance elements which are in series with the induction motor terminals, although herein shown as iron core inductors 51, 52 and 53, may be resistors, capacitors, or the like. Inductors are preferable to resistors in that the power loss therein is a minimum. Furthermore, it has been observed that motor heating is at a minimum when inductors are used as the voltage dropping impedance elements. These impedance elements may be variable so that the speed-torque curve of Figure 3C is attainable under all conditions.

Summarizing, the apparatus of the present invention as illustrated in Figure 4, provides a constant tension in wire or filament 16 between reel 17 and capstan 13, as the wire 16 fills the reel 17. The reeling structure is positive in drive and is little more expensive than the cost of the required reel motor 21. The motor 21 is of larger rating than the power requirement of the system and is preferably a three phase induction motor. Single phase or other motors may be employed. The critical speed-torque characteristic required over an unusually extensive range of motor speed is obtained by the novel introduction of impedance elements, preferably inductors, of predetermined value in series between motor 21 and the power line, the motor 21 having a normal voltage rating equal to the power source voltage.

Thus since various modifications and extensions of the principles hereinabove disclosed may now become apparent to those skilled in the art, it is preferred that these disclosures be considered illustrative and that the invention be limited solely by the spirit and scope of the appended claims.

I claim:

1. Apparatus for reeling a filament comprising a substantially constant speed induction drive motor having the characteristic that at its rated voltage the decrease in speed is normally a small fraction of the normal operating speed as the load torque changes from a small value to full load output torque, and a power source, having a voltage substantially equal to the voltage rating of the motor, an impedance element connected in series between said source and said motor, said motor being energized from said power source through said impedance element, said impedance dropping the voltage at the motor terminals from the voltage at the source by an amount directly proportional to the motor current, the voltage at the motor being dropped to a value below the voltage rating of the motor at which the normal stable induction motor characteristic is distorted so that the slip ordinarily small fluctuates over wide ranges and is proportional to the motor load, so that as the torque increases with increased load, the motor current rises, thereby increasing the impedance drop across the impedance and reducing the motor applied voltage which in turn increases the motor slip, producing a speed-torque relationship in which the speed is an inverse function of the torque.

2. Apparatus for reeling a filament at substantially constant tension comprising a substantially constant speed induction motor having the characteristic that at its rated voltage the decrease in speed is normally a small fraction of the normal operating speed as the load torque changes from a small value to full load output torque, and an electrical power source, having a voltage substantially equal to the voltage rating of the motor, an impedance element connected in series between said source and said motor, said motor being energized from said power source through said impedance element, the voltage at the motor being dropped to a value below the voltage rating of the motor at which the normal stable induction motor characteristic is distorted so that the slip ordinarily small fluctuates over wide ranges and is proportional to the motor load, so that as the torque increases with increased load, the motor current rises, and switching means for by-passing said impedance element to provide full rating starting voltage to said motor.

3. Apparatus for reeling a wire at substantially constant tension comprising an induction drive motor having a substantially constant speed characteristic for changes in load and a power source, having a voltage substantially equal to the voltage rating of the motor, an iron core inductance connected in series between said source and said motor, said induction motor being energized from said power source through an iron core inductance, the voltage at the motor being dropped to a value of the order of one-half the voltage rating of the motor at which the normal stable induction motor characteristic is distorted so that the slip ordinarily small fluctuates over wide ranges and is proportional to the motor load, so that as the torque increases with increased load, the motor current rises.

4. Apparatus for reeling a wire at substantially constant tension comprising a polyphase induction driving motor having a substantially constant speed characteristic for changes in load and a polyphase power source, having a voltage substantially equal to the voltage rating of the motor; impedance elements connected in each phase between said source and said motor, said polyphase motor being energized from said power source through said plurality of impedance elements, at voltages reduced below the motor rating to such a value that the slip ordinarily small fluctuates over wide ranges and is proportional to the motor load, so that as the torque increases with increased load, the motor current rises.

5. Apparatus for reeling a wire at substantially constant tension, said apparatus having a predetermined maximum power requirement and comprising a motor having the characteristic that at its rated voltage the decrease in speed is normally a small fraction of the normal operating speed as the load torque changes from a small value to full load output torque, and a power source, having a voltage substantially equal to the voltage rating of the motor, an impedance element connected in series between said source and said motor, said motor being energized from said power source through said impedance element, the voltage at the motor being dropped to a value below the voltage rating of the motor at which the normal stable induction motor characteristic is distorted so that the slip ordinarily small fluctuates over wide ranges and is proportional to the motor load, so that as the torque increases with increased load, the motor current rises, said motor having a normal power rating substantially in excess of said predetermined maximum power requirement, and of the order of from three to one to five to one between the rated and maximum required power and a by-pass switch around said impedance element for providing full starting voltage to said motor.

6. Apparatus for reeling a wire at substantially constant tension, said apparatus having a predetermined maximum power requirement and comprising a motor having the characteristic that at its rated voltage the decrease in speed is normally a small fraction of the normal operating speed as the load torque changes from a small value to full load output torque, and a power source, having a voltage substantially equal to the voltage rating of the motor, an impedance element connected in series between said source and said motor, said motor being energized from said power source through an impedance element, said impedance dropping the voltage at the motor terminals from the voltage at the source by an amount directly proportional to the motor current, the voltage at the motor being dropped to a value below the voltage rating of the motor at which the normal stable induction motor characteristic is distorted so that the slip ordinarily small fluctuates over wide ranges and is proportional to the motor load, so that as the torque increases with increased load, the motor current rises, thereby increasing the impedance drop across the impedance and reducing the motor applied voltage which in turn increases the motor slip, producing a speed-torque relationship in which the speed is an inverse function of the torque, said motor having a normal power rating substantially in excess of said predetermined maximum power requirement, said drive motor having a normal voltage rating substantially equal to the voltage of said power source, and of the order of from three to one to five to one between the rated and maximum required power.

7. Apparatus for reeling a wire at substantially constant tension, said apparatus having a predetermined maximum power requirement and comprising a polyphase induction drive motor and a polyphase power source, said motor being energized from said power source through a plurality of impedance elements connected between said power source and said motor, said impedance element dropping the voltage at said motor to sufficiently distort the motor characteristic to provide a speed-torque characteristic in which the speed is inversely proportional to the torque over wide ranges, said motor having a normal power rating substantially in excess of said predetermined maximum power requirement, said polyphase induction drive motor having a rated normal operating voltage substantially equal to the voltage of said power source.

RALPH L. DAVIS.

REFERENCES CITED

The following references are of record in the file of this patent:

UNITED STATES PATENTS

| Number | Name | Date |
| --- | --- | --- |
| 1,096,922 | Korndorfer | May 19, 1914 |
| 1,787,133 | Wilson | Dec. 30, 1930 |
| 1,894,928 | Wesche | Jan. 17, 1933 |
| 2,353,408 | Larsen | July 11, 1944 |

FOREIGN PATENTS

| Number | Country | Date |
| --- | --- | --- |
| 439,495 | Great Britain | Dec. 5, 1935 |